(12) United States Patent
Takeuchi et al.

(10) Patent No.: US 7,868,947 B2
(45) Date of Patent: Jan. 11, 2011

(54) MOVING IMAGE DISPLAY DEVICE AND METHOD FOR MOVING IMAGE DISPLAY

(75) Inventors: Kesatoshi Takeuchi, Shiojiri (JP); Takahiro Sagawa, Chino (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1111 days.

(21) Appl. No.: 11/588,268

(22) Filed: Oct. 27, 2006

(65) Prior Publication Data

US 2007/0103585 A1     May 10, 2007

(30) Foreign Application Priority Data

Nov. 4, 2005    (JP)  ............... 2005-320597

(51) Int. Cl.
*H04N 7/01*      (2006.01)
(52) U.S. Cl. ...................................... 348/441; 348/701
(58) Field of Classification Search ................. 348/441, 348/443, 447, 456, 458, 459, 558, 598, 561, 348/562, 584, 588, 452, 699–701; *H04N 7/01, H04N 11/20, 5/46, 5/44, 9/74, 9/76, 5/14*
See application file for complete search history.

(56) References Cited

U.S. PATENT DOCUMENTS

| | | | |
|---|---|---|---|
| 4,710,809 A | 12/1987 | Ries et al. | |
| 6,137,947 A | 10/2000 | Ohta et al. | |
| 6,438,275 B1 | 8/2002 | Martins et al. | |
| 6,625,333 B1 | 9/2003 | Wang et al. | |
| 7,576,802 B1 * | 8/2009 | Segura .................. | 348/441 |
| 2001/0024515 A1 | 9/2001 | Martins et al. | |
| 2002/0106026 A1 | 8/2002 | Demmer | |
| 2003/0202780 A1 | 10/2003 | Dumm et al. | |

(Continued)

FOREIGN PATENT DOCUMENTS

CN       1169360 C     9/2004

(Continued)

OTHER PUBLICATIONS

Oct. 21, 2009 Search Report issued in European Application No. EP 06 02 2756.

*Primary Examiner*—Sherrie Hsia
(74) *Attorney, Agent, or Firm*—Oliff & Berridge, PLC

(57) ABSTRACT

In the moving image display device of the invention, a synthesis circuit inputs signals representing specified values of pixel rate factors R2 and R3 from a pixel rate factor specification circuit, while inputting overscanned frame image data D1 in the units of pixels from a $1^{st}$ latch circuit. The synthesis circuit extracts a preset number of pixels corresponding to the specified value of the pixel rate factor R2 from a prior frame image, while extracting a preset number of pixels corresponding to the specified value of the pixel rate factor R3 from a latter frame image. The positions of pixels to be extracted from the latter frame image are complementary to the positions of pixels to be extracted from the prior frame image. The synthesis circuit combines the extracted pixels of the prior frame image with the extracted pixels of the latter frame image by a logical OR operation to generate intermediate frame image data D2. This technique of the invention is significantly simpler than the prior art technique but still effectively prevents flicker in a moving image to ensure smooth display of the moving image.

18 Claims, 12 Drawing Sheets

U.S. PATENT DOCUMENTS

| | | |
|---|---|---|
| 2004/0085480 A1 | 5/2004 | Salzer et al. |
| 2005/0001930 A1 | 1/2005 | Mao |
| 2005/0157792 A1 | 7/2005 | Baba et al. |
| 2007/0097260 A1 * | 5/2007 | Takeuchi et al. ............ 348/441 |

FOREIGN PATENT DOCUMENTS

| | | |
|---|---|---|
| EP | 1 786 200 A2 | 5/2007 |
| JP | A 4-302289 | 10/1992 |
| JP | A 8-54854 | 2/1996 |
| JP | A 2001-281625 | 10/2001 |
| JP | A 2001-296841 | 10/2001 |
| JP | A 2002-169514 | 6/2002 |
| JP | A-2003-069961 | 3/2003 |
| JP | A 2003-69961 | 3/2004 |
| JP | A-2004-120757 | 4/2004 |
| JP | A 2004-341356 | 12/2004 |
| JP | A-2007-121704 | 5/2007 |

* cited by examiner

| INTERMEDIATE FRAME IMAGE COUNT N (NUMBER) | FIRST | SECOND | THIRD | FOURTH | FIFTH | SIXTH | SEVENTH |
|---|---|---|---|---|---|---|---|
| 1 | $(1/2)\pi$ | | | | | | |
| 2 | $(1/3)\pi$ | $(2/3)\pi$ | | | | | |
| 3 | $(1/4)\pi$ | $(1/2)\pi$ | $(3/4)\pi$ | | | | |
| 4 | $(1/5)\pi$ | $(2/5)\pi$ | $(3/5)\pi$ | $(4/5)\pi$ | | | |
| 5 | $(1/6)\pi$ | $(1/3)\pi$ | $(1/2)\pi$ | $(2/3)\pi$ | $(5/6)\pi$ | | |
| 6 | $(1/7)\pi$ | $(2/7)\pi$ | $(3/7)\pi$ | $(4/7)\pi$ | $(5/7)\pi$ | $(6/7)\pi$ | |
| 7 | $(1/8)\pi$ | $(1/4)\pi$ | $(3/8)\pi$ | $(1/2)\pi$ | $(5/8)\pi$ | $(3/4)\pi$ | $(7/8)\pi$ |

| θ (rd) | θ (deg) | K2 | K3 |
|---|---|---|---|
| 0 | 0 | 1.00 | 0.00 |
| (1/12)π | 15 | 0.98 | 0.02 |
| (1/6)π | 30 | 0.93 | 0.07 |
| (1/4)π | 45 | 0.85 | 0.15 |
| (1/3)π | 60 | 0.75 | 0.25 |
| (5/12)π | 75 | 0.63 | 0.37 |
| (1/2)π | 90 | 0.50 | 0.50 |
| (7/12)π | 105 | 0.37 | 0.63 |
| (2/3)π | 120 | 0.25 | 0.75 |
| (3/4)π | 135 | 0.15 | 0.85 |
| (5/6)π | 150 | 0.07 | 0.93 |
| (11/12)π | 165 | 0.02 | 0.98 |
| π | 180 | 0.00 | 1.00 |

| 1 | 1 | 2 |
|---|---|---|
| 1 | 2 | 1 |
| 2 | 1 | 1 |

(b)

| 1 | 2 | 1 |
|---|---|---|
| 2 | 1 | 2 |

(c)

| 2 | 2 | 1 |
|---|---|---|
| 2 | 1 | 2 |
| 1 | 2 | 2 |

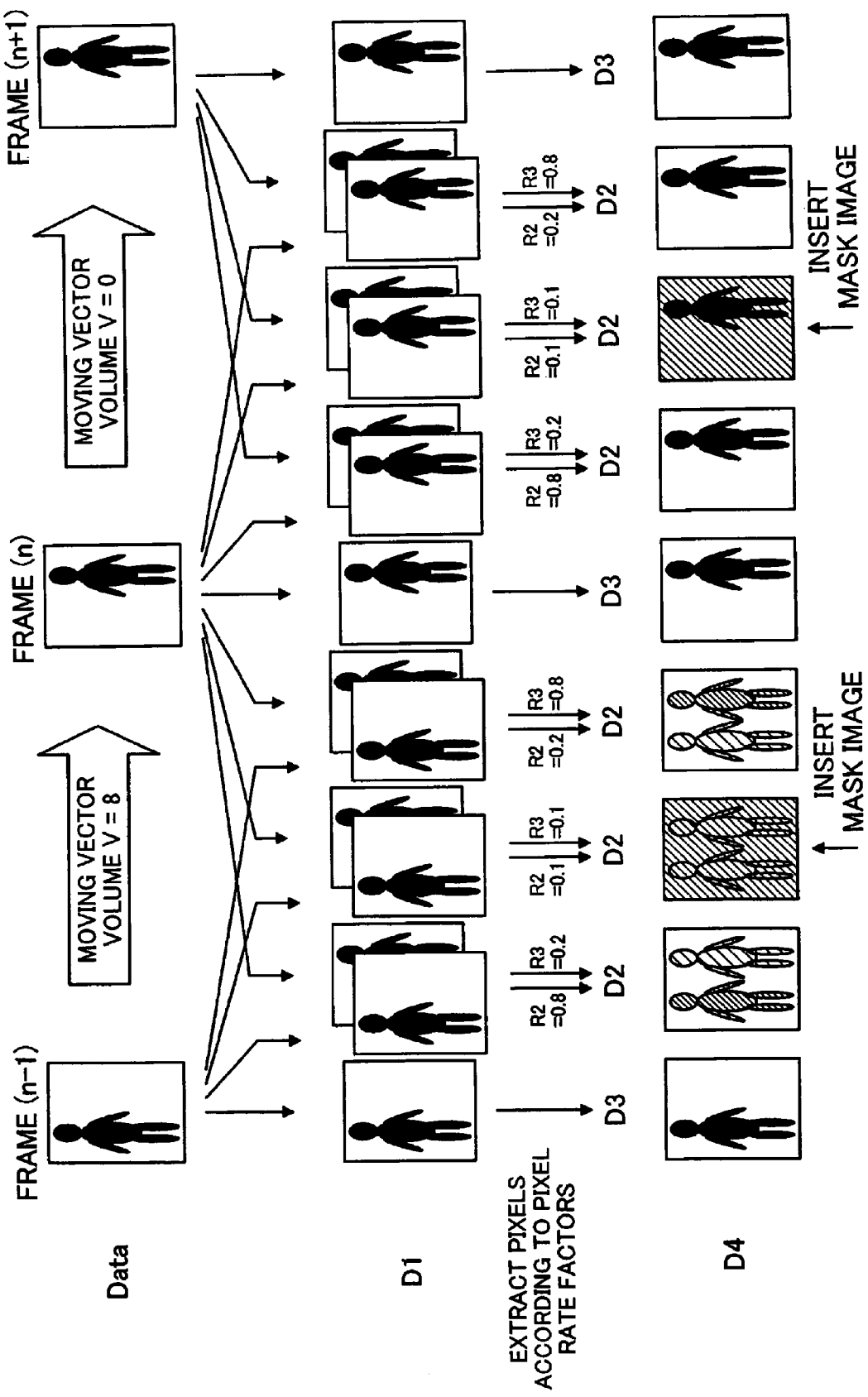

MOVING IMAGE DISPLAY DEVICE AND METHOD FOR MOVING IMAGE DISPLAY

CLAIM OF PRIORITY

The present application claims priority from Japanese Patent Applications P2005-320597A filed on Nov. 4, 2005, the contents of which are hereby incorporated by reference into this application.

BACKGROUND OF THE INVENTION.

1. Field of the Invention

The present invention relates to technology for displaying moving images by consecutively displaying a plurality of frame images, and more specifically relates to technology for synthesizing a plurality of frame images and generating an intermediate frame image.

2. Description of the Related Art

In the past, when displaying images on a moving image display device such as a CRT, television or the like with a refresh rate of less than 60 Hz, there were cases when flicker (blinking) occurred on the overall screen. However, even when a sufficient refresh rate is secured, in cases when displaying moving images such as when a moving object moves on the screen, there were cases when flicker occurred only in the moving object part on the screen rather than on the overall screen. Hereafter, this kind of flicker is called "moving image flicker." This kind of phenomenon occurs frequently, for example, when displaying moving images that move at a fixed speed such as a person, car, airplane or the like within the screen, or moving images when panning the video camera at a fixed speed.

This kind of phenomenon is not limited to CRTs and televisions, but is also seen in cases when displaying moving images on moving image display devices such as liquid crystal displays, plasma displays, projectors or the like, on the display unit of a PDA, mobile phone or the like, or on the screen in a movie theater or the like, and this was a problem common to moving image display. There were cases when once the viewers became bothered by the existence of the moving image flicker described above, they felt stress while viewing.

Regarding this kind of problem, for example in JP-A-04-302289, disclosed is technology for displaying moving images smoothly by dynamically generating new intermediate frame images from two frame images to suppress the unnaturalness of the movement when displaying moving images in a liquid crystal moving image display device or the like having an approximately 100% light emitting time ratio. In specific terms, as shown in FIG. 2 of patent reference 1, if it is a video image for which a round mark moves from left to right on the screen, by newly drawing round marks that are at two positions intermediate to the round mark within the before and after frames, an intermediate frame image is generated.

Also, disclosed in JP-A-2001-296841 is technology that detects whether an input video image is a moving image or a still image, and when a moving image is displayed, switches to the optimal display method for moving image display by taking action to double the field frequency or the like.

However, with the prior art described above, because it is necessary to generate a completely new intermediate frame from two frame images, the calculation processing for this becomes huge, so it was difficult to improve the moving image display speed. Also, to generate a completely new intermediate frame, it is necessary to secure a large frame memory capacity, and this became a factor in increasing costs. Also, when switching the display method with moving images and still images, there was concern that smooth video image display would not be possible due to the occurrence of a virtual image during switching of the display method or the like.

SUMMARY

One aspect of the present invention aims to provide a simpler technique than the prior art technique to prevent flicker in a moving image and ensure smooth display of the moving image.

In order to attain at least the above and other related objects, the present invention is directed to a moving image display device that sequentially displays frame images, each consisting of multiple pixels, for video display. The moving image display device includes: an input unit that inputs a moving image of multiple frame images at a preset frame rate; a read-out unit that reads out a first frame image and a subsequent second frame image, which is to be displayed immediately after the first frame image, from the input moving image; a mixing rate specification unit that specifies parameters representing mixing rates of the first frame image and the second frame image for synthesis; a synthesis unit that extracts pixels from the first frame image and from the second frame image in a complementary manner according to the specified parameters and combines the extracted pixels to generate at least one intermediate frame image; and a display unit that displays the generated at least one intermediate frame image after the first frame image and before the second frame image in the process of displaying the moving image.

The moving image display device of the invention adopts the extremely simple process for generation of the intermediate frame image and thus desirably enhances the processing speed. The simple process adjusts the mixing rates of the first frame image and the second frame image, which are to be displayed in this sequence, extracts the pixels from the first frame image and from the second frame image in a complementary manner, and combines the extracted pixels to generate the intermediate frame image. The synthesis process can readily follow the higher frame rate increased from the frame rate of the original moving image. This arrangement effectively prevents flicker in a moving image and ensures smooth display of the moving image.

The moving image display device of the invention adjusts the mixing rates of the first frame image and the second frame image, which are to be displayed in this sequence, extracts the pixels from the first frame image and from the second frame image in a complementary manner, and combines the extracted pixels to readily generate the intermediate frame image. Adoption of this extremely simple synthesis technique does not require generation of completely new intermediate frame images. The synthesis process accordingly has the extremely simple hardware configuration and saves the required memory capacity. This arrangement desirably reduces the manufacturing cost and still provides a moving image display device having the capability of smooth video display.

The sum of the mixing rate of the first frame image and the mixing rate of the second frame image may not be 100%. For example, the pixels extracted from the first frame image and the pixels extracted from the second frame image may respectively cover 20% and 30% of the total area of the generated intermediate frame image, while the residual 50% of the total area consists of pixels in a predetermined color, for example, black or white.

BRIEF DESCRIPTION OF THE DRAWINGS

FIG. 13 shows mask patterns applicable in Modification 6. and

FIG. 14 shows generation of intermediate frame images in Modification 9.

DESCRIPTION OF THE PREFERRED EMBODIMENTS

Figure 1:
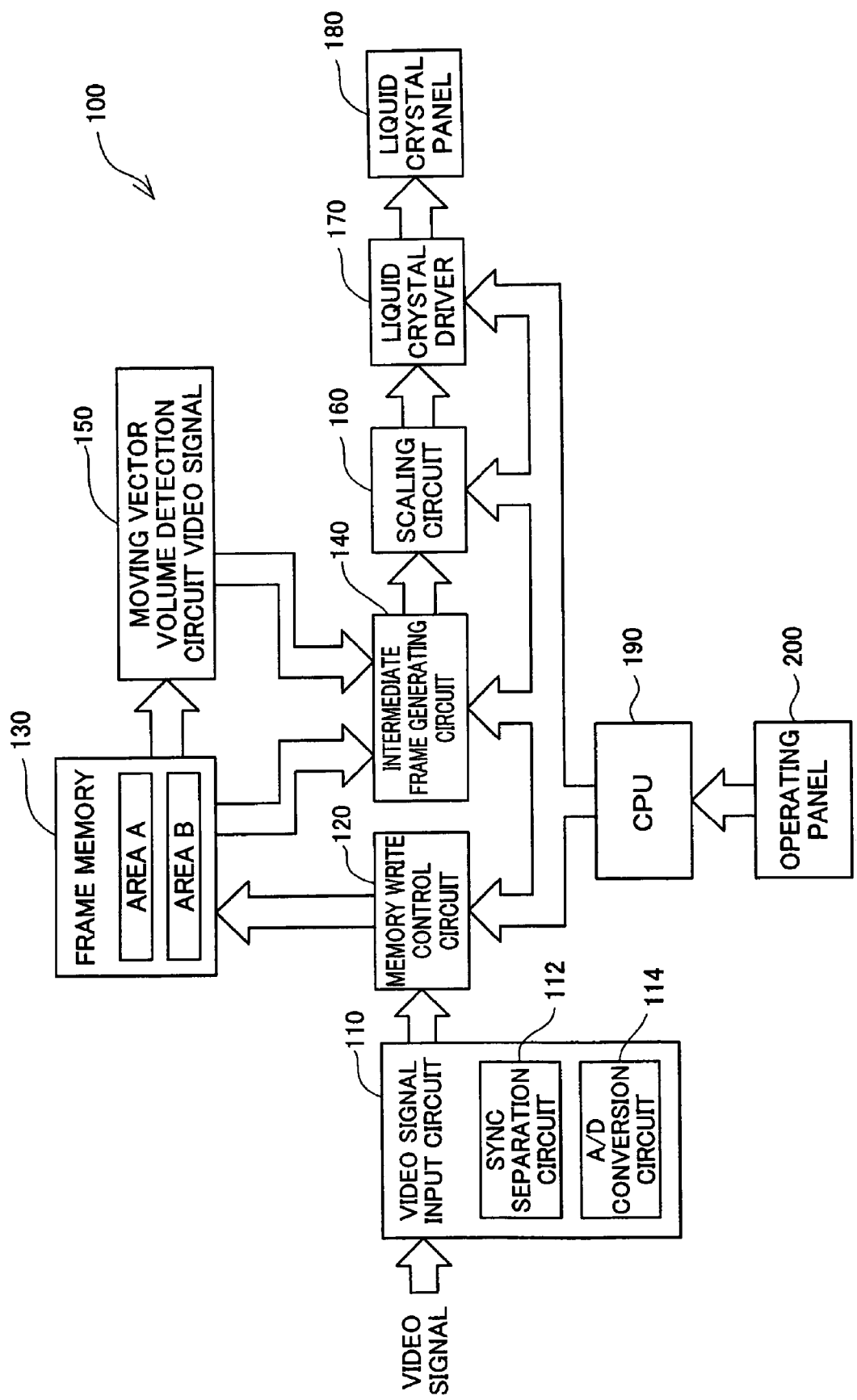
FIG. 1 is a block diagram showing the hardware constitution of the projector 100.

In order to elucidate the functions and the effects of the invention, some modes of carrying out the invention are described below as preferred embodiments in the following sequence with reference to the accompanied drawings:

A. First Embodiment
   (A-1) Hardware Configuration of Projector
   (A-2) Structure and Operations of Intermediate Frame Generation Circuit
   (A-3) Effects
B. Second Embodiment
C. Third Embodiment
D. Modifications
   A. First Embodiment
(A-1) Hardware Configuration of Projector FIG. 1 is a block diagram showing the hardware configuration of a projector 100 in one embodiment of the moving image display device of the invention. The projector 100 has the function of displaying a moving image with at least a 2-fold frame rate of an original moving image. A concrete arrangement for enabling the video display with at least the 2-fold frame rate will be described later in detail.

As illustrated, the projector 100 of the embodiment includes a video signal input circuit 110, a memory write control circuit 120 connected with the video signal input circuit 110, a frame memory 130 connected with the memory write control circuit 120, a moving vector volume detection circuit 150 connected with the frame memory 130, an intermediate frame generating circuit 140 connected with the frame memory 130 and the moving vector volume detection circuit 150, a scaling circuit 160 connected with the intermediate frame generating circuit 140, a liquid crystal driver 170 connected with the scaling circuit 160, a liquid crystal panel 180 connected with the liquid crystal driver 170, a CPU 190 connected with the memory write control circuit 120, the intermediate frame generating circuit 140, the scaling circuit 160, and the liquid crystal driver 170, and an operating panel 200 connected with the CPU 190.

The video signal input circuit 110 inputs video signals including composite signals, S video signals, and component signals from external devices, for example, DVD players, video cassette recorders, and personal computers. The video signal is generally an analog signal having 30 frame images per second. The video signal input circuit 110 includes a synchronizing separation circuit 112 and an A/D conversion circuit 114.

The synchronizing separation circuit 112 separates synchronizing signals, such as a vertical synchronizing signal VSync and a horizontal synchronizing signal HSync, from the input video signal. The synchronizing separation circuit 112 utilizes a PLL circuit or another equivalent circuit to generate a dot clock DCK in response to the cycles of the separated vertical synchronizing signal VSync and horizontal synchronizing signal HSync. The synchronizing separation circuit 112 is not required and may thus be omitted when video signals are input after separation of such synchronizing signals.

The A/D conversion circuit 114 converts the analog video signal after separation of the synchronizing signals into a digital video signal and outputs the generated digital video signal to the memory write control circuit 120.

The memory write control circuit 120 writes each frame image of the digital video signal, which is input from the video signal input circuit 110, as frame image data into the frame memory 130. The frame memory 130 has two write areas (area A and area B) corresponding to two frames. The memory write control circuit 120 alternately writes the frame images into these two write areas. In the structure of this embodiment, the frame memory 130 has two write areas. In one possible modification, the frame memory may have three or more write areas, and the frame images may be sequentially written into these multiple write areas.

The moving vector volume detection circuit 150 compares the two frame image data sequentially written in the two write areas of the frame memory 130 and computes a moving vector volume V of a moving body included in both the two frame image data. The moving vector volume V is obtained by dividing each of the two frame image data into multiple blocks and detects a luminance variation in each block, which is commonly included in both the two frame image data. The detection or computation of the moving vector volume may follow any of suitable known techniques (see, for example, JP-A-2003-69961).

The intermediate frame generating circuit 140 reads the two frame image data from the frame memory 130 and combines the two frame image data with adjustment of their mixing ratio to generate intermediate frame image data. The detailed structure and the operations of the intermediate frame generating circuit 140 will be described later. The intermediate frame generating circuit 140 outputs the generated intermediate frame image data, as well as the frame image data read from the frame memory 130, to the scaling circuit 160.

The scaling circuit 160 expands or contracts the frame image data (scaling), which is input from the intermediate frame generating circuit 140, according to the resolution of the liquid crystal panel 180. Such expansion/contraction (scaling) of the frame image data may otherwise be performed when the memory write control circuit 120 writes the frame image into the frame memory 130 or when the intermediate frame generating circuit 140 reads the frame image data from the frame memory 130. The scaling circuit 160 is not required and may thus be omitted in these modified arrangements.

The liquid crystal driver 170 inputs the frame image data from the scaling circuit 1660 and drives the liquid crystal panel 180 according to the RGB tone values of the input frame image data.

The liquid crystal panel 180 is driven by the liquid crystal driver 170 to form an output image. The output image formed by the liquid crystal panel 180 is projected and displayed by means of an optical system (not shown) on a projection screen.

The CPU 190 inputs the setting of a synthesis mode (described later) for generation of the intermediate frame image data and diversity of other settings entered through the user's manipulation of the operating panel 200, and controls the memory write control circuit 120, the intermediate frame generating circuit 140, the scaling circuit 160, and the liquid crystal driver 170, based on the input settings.

(A-2) Structure and Operations of Intermediate Frame Generation Circuit

Figure 2:
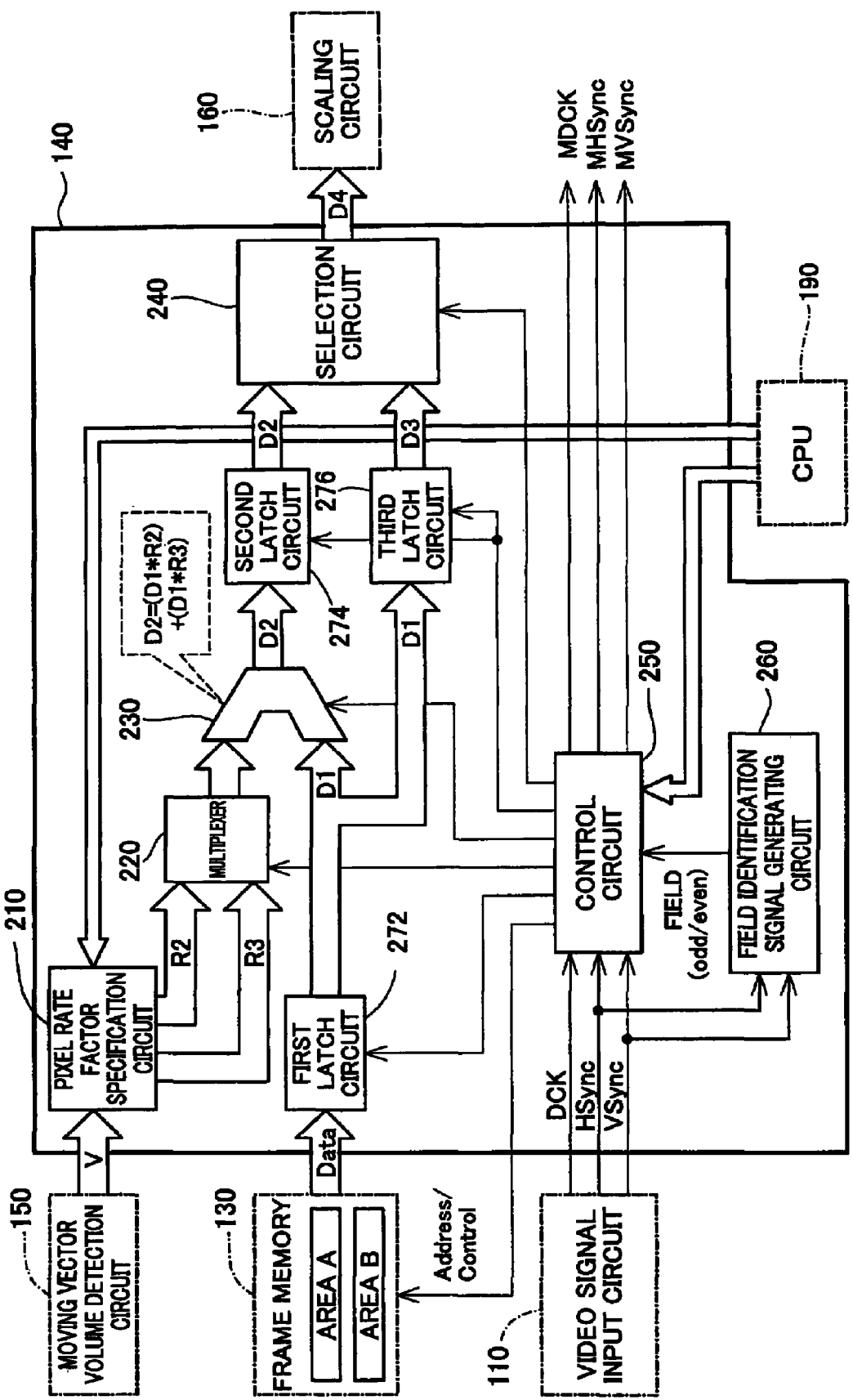
FIG. 2 is a block diagram showing the detailed constitution of the intermediate frame generating circuit 140.

FIG. 2 is a block diagram showing the detailed structure of the intermediate frame generating circuit 140. As illustrated, the intermediate frame generating circuit 140 includes a pixel rate factor specification circuit 210 connected with the moving vector volume detection circuit 150, a multiplexer 220 connected with the pixel rate factor specification circuit 210, a $1^{st}$ latch circuit 272 connected with the frame memory 130, a synthesis circuit 230 connected with the multiplexer 220 and the $1^{st}$ latch circuit 272, a $2^{nd}$ latch circuit 274 connected with the synthesis circuit 230, a $3^{rd}$ latch circuit 276 connected with the $1^{st}$ latch circuit 272, and a selection circuit 240 connected with the $2^{nd}$ latch circuit 274 and the $3^{rd}$ latch circuit 276. The intermediate frame generating circuit 140 further includes a control circuit 250 that is connected with the video signal input circuit 110 and controls the other respective circuits of the intermediate frame generating circuit 140, and a field identification signal generation circuit 260.

The field identification signal generation circuit 260 inputs the horizontal synchronizing signal HSync and the vertical synchronizing signal VSync from the video signal input circuit 110 and generates a field identification signal from these input synchronizing signals HSync and VSync. The field identification signal identifies an object field to be displayed as an even field or an odd field in the interlace display system. The field identification signal generation circuit 260 outputs the generated field identification signal to the control circuit 250.

The control circuit 250 inputs the horizontal synchronizing signal HSync, the vertical synchronizing signal VSync, and the dot clock DCK from the video signal input circuit 110, while inputting the field identification signal from the field identification signal generation circuit 260. The control circuit 250 controls the read-out operation of the frame image data from the frame memory 230 and the operations of the $1^{st}$ latch circuit 272, the $2^{nd}$ latch circuit 274, the $3^{rd}$ latch circuit 276, the multiplexer 220, the synthesis circuit 230, and the selection circuit 240, based on these input signals.

The control circuit 250 reads out frame image data to be displayed first (hereafter referred to as 'prior frame image') and frame image data to be displayed later (hereafter referred to as 'latter frame image') three consecutive times from the areas A and B set in the frame memory 130 at a 2-fold cycle of the frame rate of the original moving image (see the middle row of FIG. 5). This read-out operation is hereafter referred to as 'overscan'. Alternate output of corresponding pixels attains simultaneous read-out of the prior frame image by its third scan and the latter frame image by its first scan. A burst mode is adopted for the read-out from the respective areas set in the frame memory 130. The overscanned frame image data are held in the units of pixels in the $1^{st}$ latch circuit 272. The $1^{st}$ latch circuit 272 outputs frame image data D1, which sustains divisions corresponding to the areas A and B set in the frame memory 130, to both the synthesis circuit 230 and the $3^{rd}$ latch circuit 276. The $3^{rd}$ latch circuit 276 holds only the second output of the prior frame image data scanned three times and included in the frame image data D1 output from the $1^{st}$ latch circuit 272, as frame image data D3.

The pixel rate factor specification circuit 210 specifies the values of a pixel rate factor R2 and a pixel rate factor R3 according to the synthesis mode set by the CPU 190 and outputs signals representing the specified values of the pixel rate factors R2 and R3 to the synthesis circuit 230. The pixel rate factor R2 is a parameter for adjusting a mixing rate of the prior frame image as one source for generation of an intermediate frame image. The pixel rate factor R3 is a parameter for adjusting a mixing rate of the latter frame image as the other source for generation of the intermediate frame image. In the structure of this embodiment, the values of the pixel rate factors R2 and R3 are set to satisfy the condition that the sum of these two pixel rate factors R2 and R3 is fixed to 1. This condition is, however, not essential, and the sum of the two pixel rate factors R2 and R3 may be less than 1; for example, the pixel rate factor R2=0.2 and the pixel rate factor R3=0.3.

The synthesis mode set by the CPU 190 has two options, a fixation mode and a variable mode. In the fixation mode, the pixel rate factor R2 and the pixel rate factor R3 are fixed to preset values, irrespective of the computed moving vector volumeV. The fixation mode has three different states, that is, a 'prior-latter frames equivalent mode', a 'latter-frame preference mode' and a 'prior frame preference mode'. In the 'prior-latter frames equivalent mode', the prior frame image and the latter frame image are combined at the same mixing rate by setting both the pixel rate factors R2 and R3 to an identical value, for example, 0.5. In the 'latter-frame preference mode', the mixing rate of the latter frame image is higher than the mixing rate of the prior frame image. In the 'prior frame preference mode', the mixing rate of the prior frame image is higher than the mixing rate of the latter frame image.

In the 'prior-latter frames equivalent mode', alternate selection of pixels from the prior frame image and from the latter frame image completes the synthesis. This desirably simplifies the whole processing operation. In the 'latter-frame preference mode', a resulting intermediate frame image has the greater effect of the latter frame image than the prior frame image. In the 'prior frame preference mode', a resulting intermediate frame image has the greater effect of the prior frame image than the latter frame image.

In the variable mode, the values of the pixel rate factor R2 and the pixel rate factor R3 are changeable according to the moving vector volumeV input from the moving vector volume detection circuit 150. In the variable mode, the pixel rate factor specification circuit 210 refers to a pixel rate factor table shown in FIG. 3 to specify the values of the pixel rate factor R2 and the pixel rate factor R3.

Figure 3:
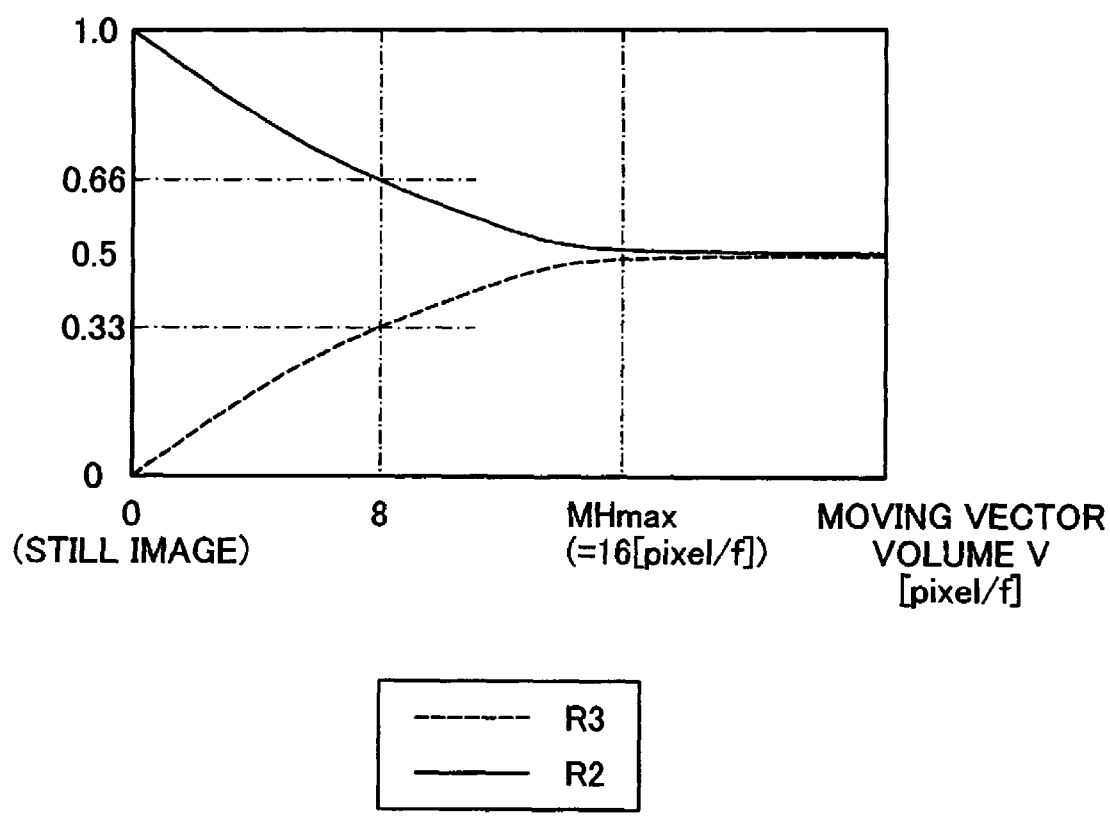
FIG. 3 is an explanatory drawing showing an example of the brightness coefficient table.

FIG. 3 shows one example of the pixel rate factor table. The pixel rate factor table is set to gradually decrease the pixel rate factor R2 from 1.0 and to gradually increase the pixel rate factor R3 from 0 against a variation in moving vector volumeV from 0 with no motion between the prior frame image and the latter frame image to a maximum visual limit MHmax, which represents the tracking limitation of the human vision. In the pixel rate factor table, the decreasing pixel rate factor R2 and the increasing pixel rate factor R3 are both converged to 0.5 in the range of the moving vector volumeV of greater than the maximum visual limit MHmax. Namely the pixel rate factor table is set to give an intermediate frame image having the greater effect of the prior frame image than the latter frame image at the smaller moving vector volumeV in the ordinary range of the moving vector volumeV of not greater than the maximum visual limit MHmax.

The user operates the operating panel 200 to arbitrarily select one of the above options as the desired synthesis mode. The CPU 190 accepts the user's selected synthesis mode and sets the selected synthesis mode in the pixel rate factor specification circuit 210. This arrangement enables the user to flexibly set the synthesis mode suitable for each moving image according to the purpose of the video display. In one possible modification, the user may arbitrarily set the values of the pixel rate factors R2 and R3 in the fixation mode.

When the projector 100 supports only the fixation mode but not the variable mode, the moving vector volume detection circuit 150 may be omitted. This modified arrangement does not require the processing based on the moving vector volume for still images (moving vector volume=0), thus simplifying the processing and the circuit structure.

The multiplexer 220 inputs the signals representing the specified values of the pixel rate factors R2 and R3 from the pixel rate factor specification circuit 210, multiplexes these input signals in a time-sharing manner, and outputs the multiplexed signals to the synthesis circuit 230.

The synthesis circuit 230 inputs the multiplexed signals representing the specified values of the pixel rate factor R2 and the pixel rate factor R3 from the multiplexer 220, while inputting the overscanned frame image data D1 in the units of pixels from the $1^{st}$ latch circuit 272. In the process of alternate pixel input from the prior frame image by the third scan and from the latter frame image by the first scan, the synthesis circuit 230 extracts the preset number of pixels corresponding to the specified value of the pixel rate factor R2 from the prior frame image and extracts the preset number of pixels corresponding to the specified value of the pixel rate factor R3 from the latter frame image. For example, when the pixel rate factor R2 is equal to '0.33' and the pixel rate factor R3 is equal to '0.66', the synthesis circuit 230 extracts one pixel from three input pixels of the prior frame image and extracts two pixels from three input pixels of the latter frame image. The positions of two pixels extracted from the latter frame image are complementary to the position of one pixel extracted from the prior frame image (see the bottom row of FIG. 5). Pixels are extracted from different positions on Y-th line, (Y+1)-th line, and (Y+2)-th line in each frame image according to the specified values of the pixel rate factors R2 and R3. The synthesis circuit 230 combines the extracted pixels of the prior frame image with the extracted pixels of the latter frame image by logical OR operation according to Equation (1) given below to generate intermediate frame image data D2:

D2=(Prior Frame Image Data D1 * R2) or (Latter Frame Image Data D1 * R3)  ....(1)

The $2^{nd}$ latch circuit 274 holds the intermediate frame image data D2 generated by the synthesis circuit 230.

The selection circuit 240 inputs the intermediate frame image data D2 held by the $2^{nd}$ latch circuit 274 and the frame image data D3 held by the 3rd latch circuit 276 and alternately selects these two input data at a frequency of twice the frequency of the vertical synchronizing signal VSync of the original moving image. The selected frame image data is output as frame image data D4 to the scaling circuit 160. The scaling circuit 160 inputs from the control circuit 250 a dot clock MDCK, a horizontal synchronizing signal MHSync, and a vertical synchronizing signal MVSync required for display of the frame image data D4 on the liquid crystal panel 180. In the structure of this embodiment, the frequency of the vertical synchronizing signal MVSync is double the frequency of the vertical synchronizing signal VSync input from the video signal input circuit 110.

Figure 4:
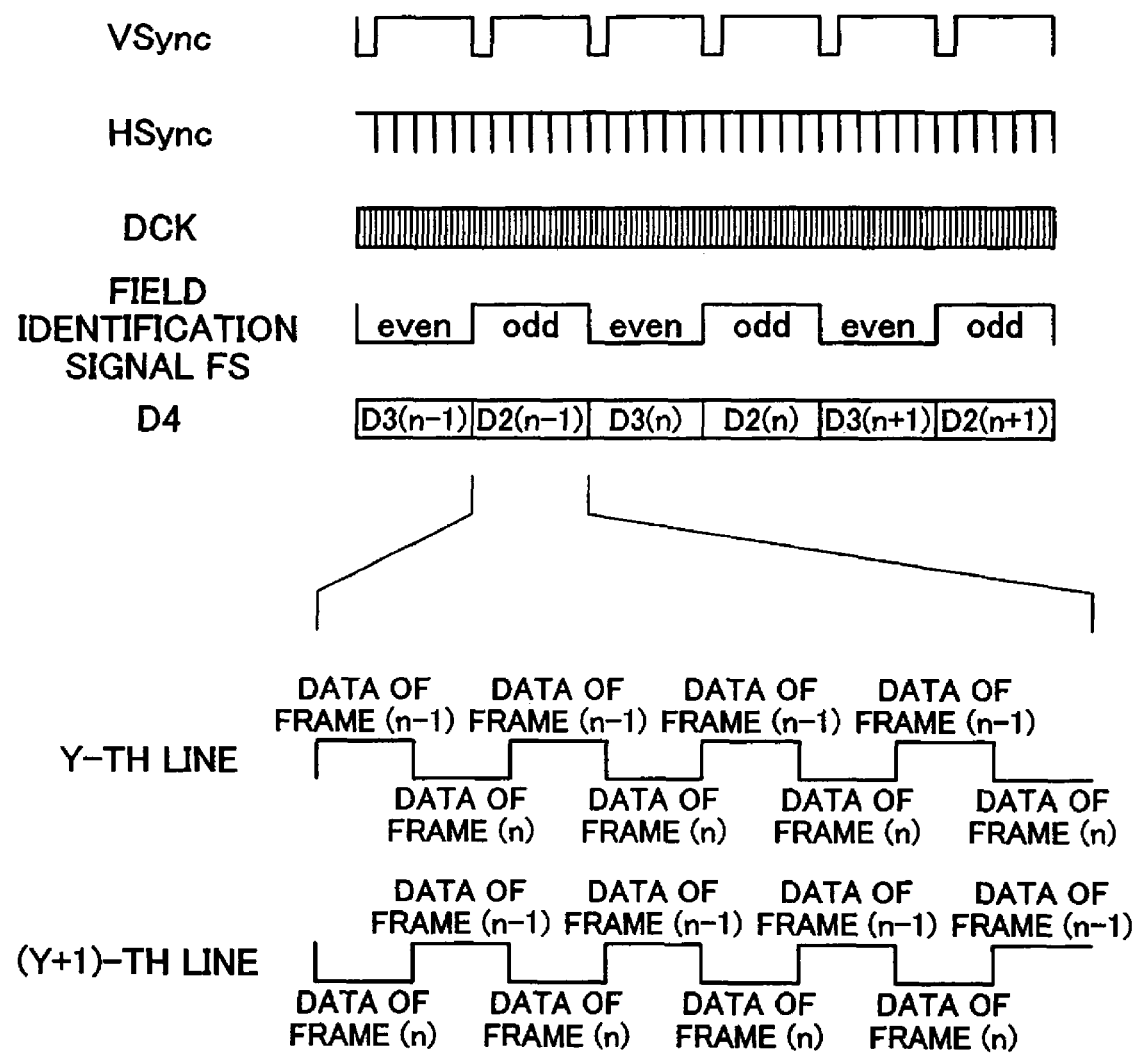
FIG. 4 is an explanatory drawing showing in simple form a timing chart of the operation of the intermediate frame generating circuit 140.

FIG. 4 is a timing chart showing the schematic operations of the intermediate frame generating circuit 140 in the embodiment. The intermediate frame generating circuit 140 inputs the horizontal synchronizing signal HSync, the vertical synchronizing signal VSync, and the dot clock DCK from the video signal input circuit 110 and generates a field identification signal FS from these input signals. The intermediate frame generating circuit 140 outputs frame image data D3 (D3(n−1), D3(n), and D3(n+1) shown in FIGS. 4 and 5), which are directly obtained from the original moving image, at timings 'even' for displaying even fields and intermediate frame image data D2 (D2(n−1), D2(n), and D2(n+1) shown in FIGS. 4 and 5), which are generated by the intermediate frame generating circuit 140, at timings 'odd' for displaying odd fields, as the eventually output frame image data D4.

The lower half of FIG. 4 shows the output of two lines, Y-th line and (Y+1)-th line, in the intermediate frame image data D2 (n−1) with regard to the frame (n−1) when the pixel rate factors R2 and R3 are both set equal to 0.5. As shown in FIG. 4, the pixels of the frame (n−1) and the pixels of the frame (n) are alternately output on the Y-th line. The pixels of the frame (n) and the pixels of the frame (n−1) are alternately output on the (Y+1)-th line, which is displayed immediately below the Y-th line. The phase of the alternate pixel output on the (Y+1)-th line is opposite to the phase of the alternate pixel output on the Y-th line. The resulting output image has the pixels of the prior frame image and the pixels of the latter frame image arranged in a checker pattern.

Figure 5:
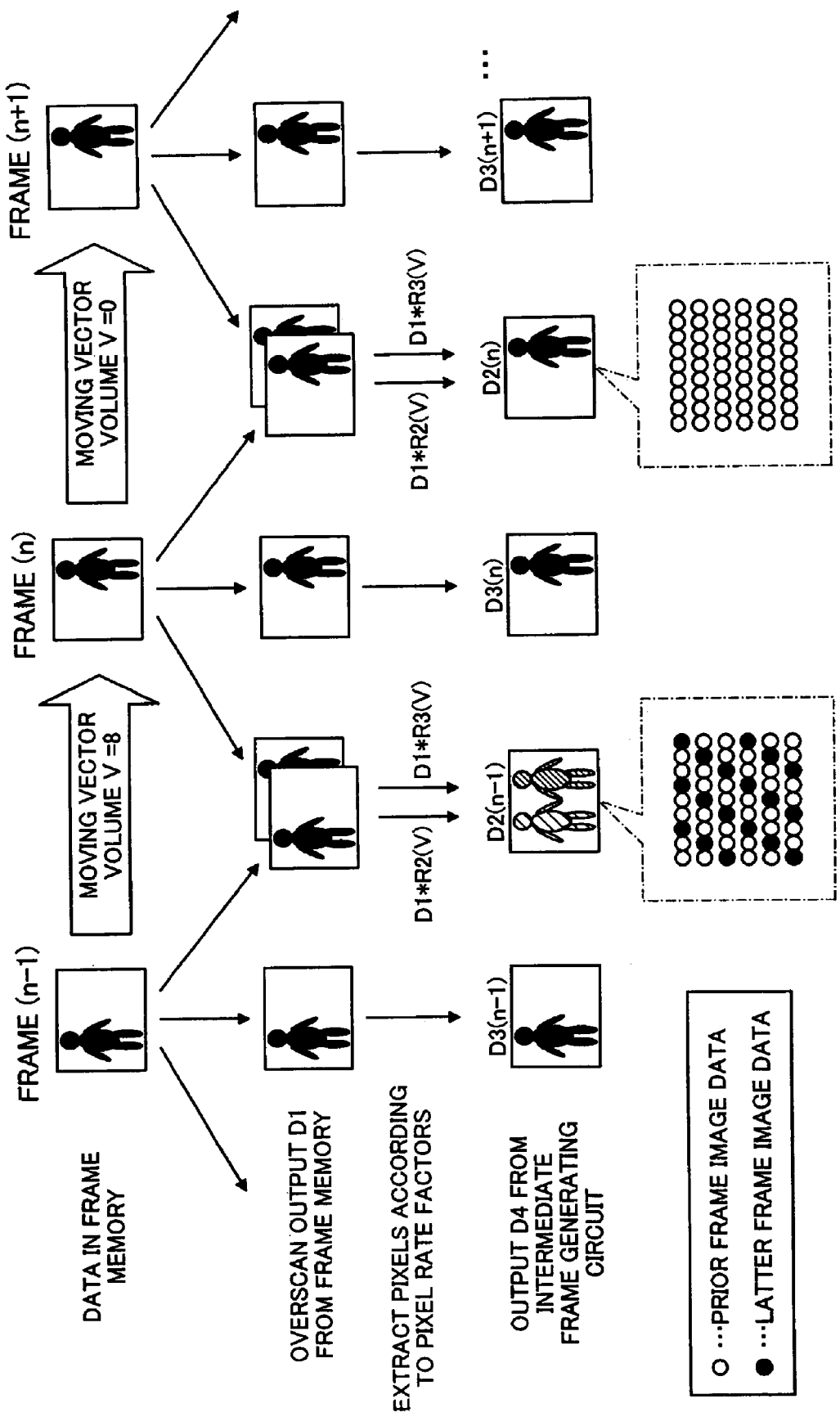
FIG. 5 is an explanatory drawing visually expressing the moving image formed on the liquid crystal panel 180 according to the frame image data output by the intermediate frame generating circuit 140.

FIG. 5 shows visual representation of a moving image formed on the liquid crystal panel 180 according to the frame image data output from the intermediate frame generating circuit 140. The upper row shows frame image data 'Data' stored in the frame memory 130, the middle row shows frame image data 'D1' overscanned from the frame memory 130, and the bottom row shows frame image data 'D4' output from the selection circuit 240. The frame image data D4 shown in the bottom row of FIG. 5 has the same frame numbers as those of the frame image data D4 shown in FIG. 4.

When frame image data of frames (n−1), (n), and (n+1) are sequentially stored into the frame memory 130 (see the upper row), the control circuit 250 overscans the frame image data of each frame to give three outputs of each frame image (see the middle row). For convenience of illustration, only two outputs among the actual three outputs are shown for the frames (n−1) and (n+1). Among the three outputs of each overscanned frame image, the second output goes through the processing by the $1^{st}$ latch circuit 272 and the $3^{rd}$ latch circuit 276 and is directly output as the frame image data D4 by the selection circuit 240. The synthesis circuit 230 combines the pixels of the third output of the prior frame image with the pixels of the first output of the latter frame image according to the specified values of the pixel rate factors R2 and R3 to generate intermediate frame image data D2. The generated intermediate frame image data D2 goes through the $2^{nd}$ latch circuit 274 and is selected and output as the frame image data D4 by the selection circuit 240. The selection circuit 240 alternately outputs the frame image data D3 of the original moving image and the intermediate frame image data D2 generated by the intermediate frame generating circuit 140 as D3, D2, D3, D2, . . . to form a resulting image on the liquid crystal panel 180.

In the illustrated example of FIG. 5, the moving vector volume V between the frame (n−1) and the frame (n) is equal to 8. The values of the pixel rate factors R2 and R3 are specified according to this moving vector volume V and the pixel rate factor table shown in FIG. 3. For example, the specified values of the pixel rate factor R2 and the pixel rate factor R3 are respectively equal to '0.33' and '0.66'. In this case, the synthesis circuit 230 extracts the pixels from the prior frame image of the frame (n−1) and the pixels from the latter frame image of the frame (n) to satisfy the mixing ratio of 2 to 1. The resulting intermediate frame image data D2 (n−1) is the mixture of the pixels extracted from these two adjoining frame images of the frames (n−1) and (n) as shown by the pattern of open circles and closed circles at the bottom of FIG. 5. The moving vector volume V between the frame (n) and the frame (n+1) is equal to 0. The specified values of the pixel rate factor R2 and the pixel rate factor R3 according to the pixel rate factor table of FIG. 3 are respectively equal to '1' and '0'. The resulting intermediate frame image data D2 has the mixing rate '100%' of the prior frame image of the frame (n) as shown by the pattern of all open circles at the bottom of FIG. 5.

(A-3) Effects

Figure 6:
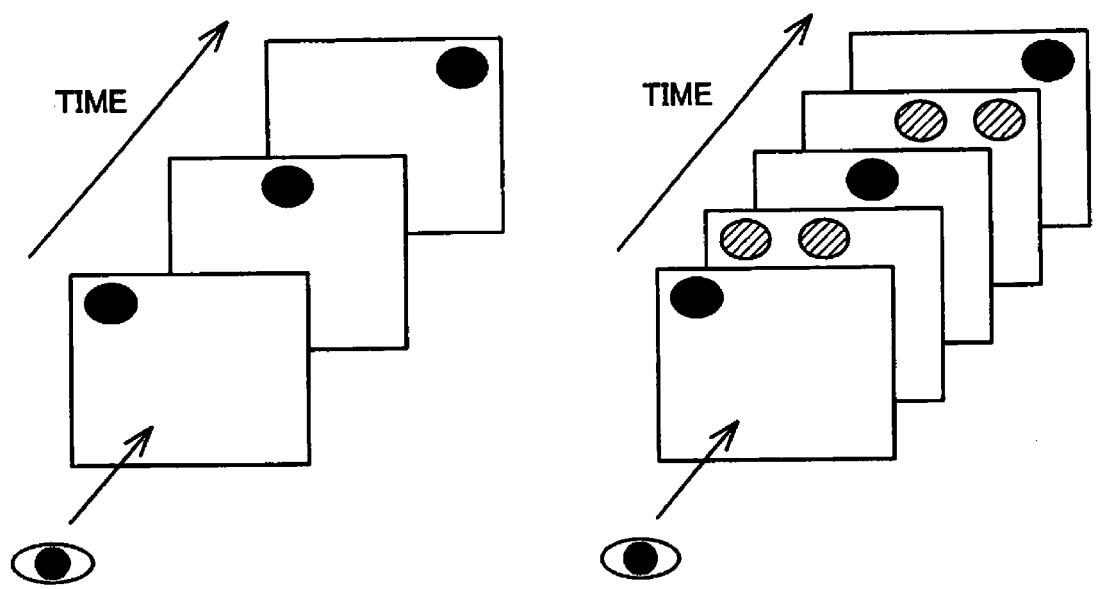
FIG. 6 is an explanatory drawing showing the effect of the embodiment.

FIG. 6 shows the effects of this embodiment with regard to a moving image of a rightward-moving closed circle. The left-side drawing shows a visual representation without generation of intermediate frame images, and the right-side drawing shows a visual representation with generation of intermediate frame images in the embodiment. In the case of no generation of intermediate frame images shown in the left-side drawing, the status of the closed circle is changeable between only two stages, that is, 'on (display)' and 'off (no display)'. Even at the appropriate frame rate, the high traveling speed of the closed circle causes the user's observation of a discontinuous motion of the closed circle as flicker of the moving image. In the technique of the embodiment shown in the right-side drawing, on the other hand, intermediate frame images synthesized with adjustment of the mixing ratio of the prior frame to the latter frame are inserted between the existing frame images of the original moving image. This causes the user's observation of a continuous and smooth motion of the closed circle, thus decreasing the flicker of the moving image and reducing the user's visual load.

The procedure of this embodiment generates an intermediate frame image by the extremely simple process of combining the pixels from a prior frame image with the pixels from a latter frame image with adjustment of the respective mixing rates. Adoption of this extremely simple synthesis technique ensures the high-speed processing. The synthesis process can readily follow the frame rate increased to at least double the frame rate of the original moving image. This arrangement thus ensures smooth and continuous display of a moving image.

As mentioned above, the procedure of this embodiment generates an intermediate frame image by the extremely simple process of combining the pixels from a prior frame image with the pixels from a latter frame image with adjustment of the respective mixing rates. Adoption of this synthesis technique does not require generation of completely new intermediate frame images. The synthesis process accordingly has the extremely simple circuit structure and saves the required memory capacity. This arrangement desirably reduces the manufacturing cost and still provides a projector having the capability of smooth video display.

Even when one video includes both a moving image and still images, the procedure of this embodiment adopts the same circuit structure and the same algorithm to generate intermediate frame images and effectively prevents the occurrence of flicker in only the moving image. This arrangement does not require switchover between two separate circuit structures for displaying the moving image and for displaying the still images but enables display of both the moving image and the still images by the simple common circuit structure. The technique of the embodiment does not adopt different systems for displaying the moving image and for displaying the still images and is thus free from the occurrence of phantom images in switchover between the display system of the moving image and the display system of the still images. These effects are especially prominent for the video display in the fixation mode with omission of the moving vector volume detection circuit 150.

B. Second Embodiment

The first embodiment described above generates one intermediate frame image between each pair of existing frame images and displays a moving image at the 2-fold cycle of the frame rate of the original moving image. A second embodiment described below generates two intermediate frame images between each pair of existing frame images and displays a moving image at a 3-fold cycle of the frame rate of the original moving image.

Figure 7:
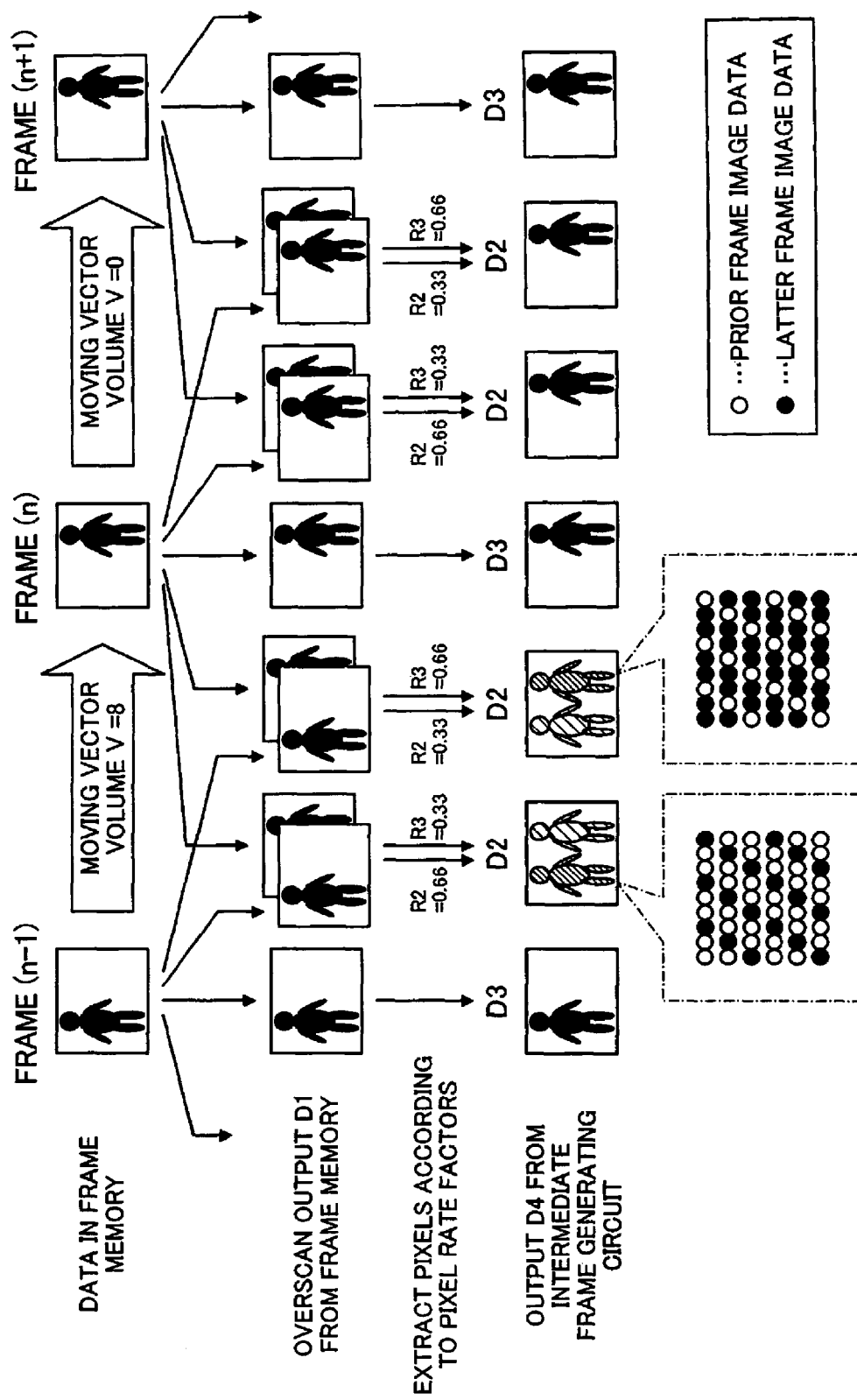
FIG. 7 is an explanatory drawing visually expressing the moving image formed on the liquid crystal panel 180 of the second embodiment.

FIG. 7 shows visual representation of a moving image formed on the liquid crystal panel 180 in the second embodiment. As shown in the upper row and the middle row of FIG. 7, in the second embodiment, when the memory write control circuit 120 sequentially writes frame image data of frames (n−1), (n), and (n+1) into the frame memory 130, the control circuit 250 reads out the frame image data five consecutive times at a 3-fold cycle of the frame rate of the original moving image. Alternate output of corresponding pixels attains simultaneous read-out of the prior frame image by its fourth scan and the latter frame image by its first scan and simultaneous read-out of the prior frame image by its fifth scan and the latter frame image by its second scan. Among the five outputs of each overscanned frame image, the third output goes through the processing by the $1^{st}$ latch circuit 272 and the $3^{rd}$ latch circuit 276 and is directly output as the frame image data D4 by the selection circuit 240 as shown in the bottom row of FIG. 7. The synthesis circuit 230 combines the pixels of the fourth output of the prior frame image with the pixels of the first output of the latter frame image and combines the pixels of the fifth output of the prior frame image with the pixels of the second output of the latter frame image according to the respectively specified values of the pixel rate factors R2 and R3 to generate two consecutive intermediate frame image data D2. The generated intermediate frame image data D2 go through the $2^{nd}$ latch circuit 274 and are selected and output as the frame image data D4 by the selection circuit 240.

In the illustrated example of FIG. 7, the first intermediate frame image and the second intermediate frame image of the two consecutively generated intermediate frame image data D2 have different settings of the pixel rate factor R2 and the pixel rate factor R3. The first intermediate frame image has the pixel rate factor R2=0.66 and the pixel rate factor R3=0.33, whereas the second intermediate frame image has the pixel rate factor R2=0.33 and the pixel rate factor R3=0.66. This gradually lowers the mixing rate of the prior frame image with a gradual increase in mixing rate of the latter frame image and has the visual effect of a continuous motion of a moving body.

In the illustrated example of FIG. 7, the pixel rate factors R2 and R3 are fixed to the preset values. One modified procedure may refer to the pixel rate factor table shown in FIG. 3 to set the values of the pixel rate factors R2 and R3 with regard to the first intermediate frame image and exchange the settings of the pixel rate factor R2 and the pixel rate factor R3 for the second intermediate frame image. Different tables may be provided and used to set the values of the pixel rate factors R2 and R3 for the first intermediate frame image and to set the values of the pixel rate factors R2 and R3 for the second intermediate frame image.

The technique of the second embodiment generates and displays a greater number of intermediate frame images than those of the first embodiment and thus more effectively prevents the occurrence of flicker in the moving image.

C. Third Embodiment

The second embodiment described above generates two intermediate frame image between each pair of existing frame images and displays a moving image at the 3-fold cycle of the frame rate of the original moving image. A third embodiment described below generates three intermediate frame images between each pair of existing frame images and displays a moving image at a 4-fold cycle of the frame rate of the original moving image.

Figure 8:
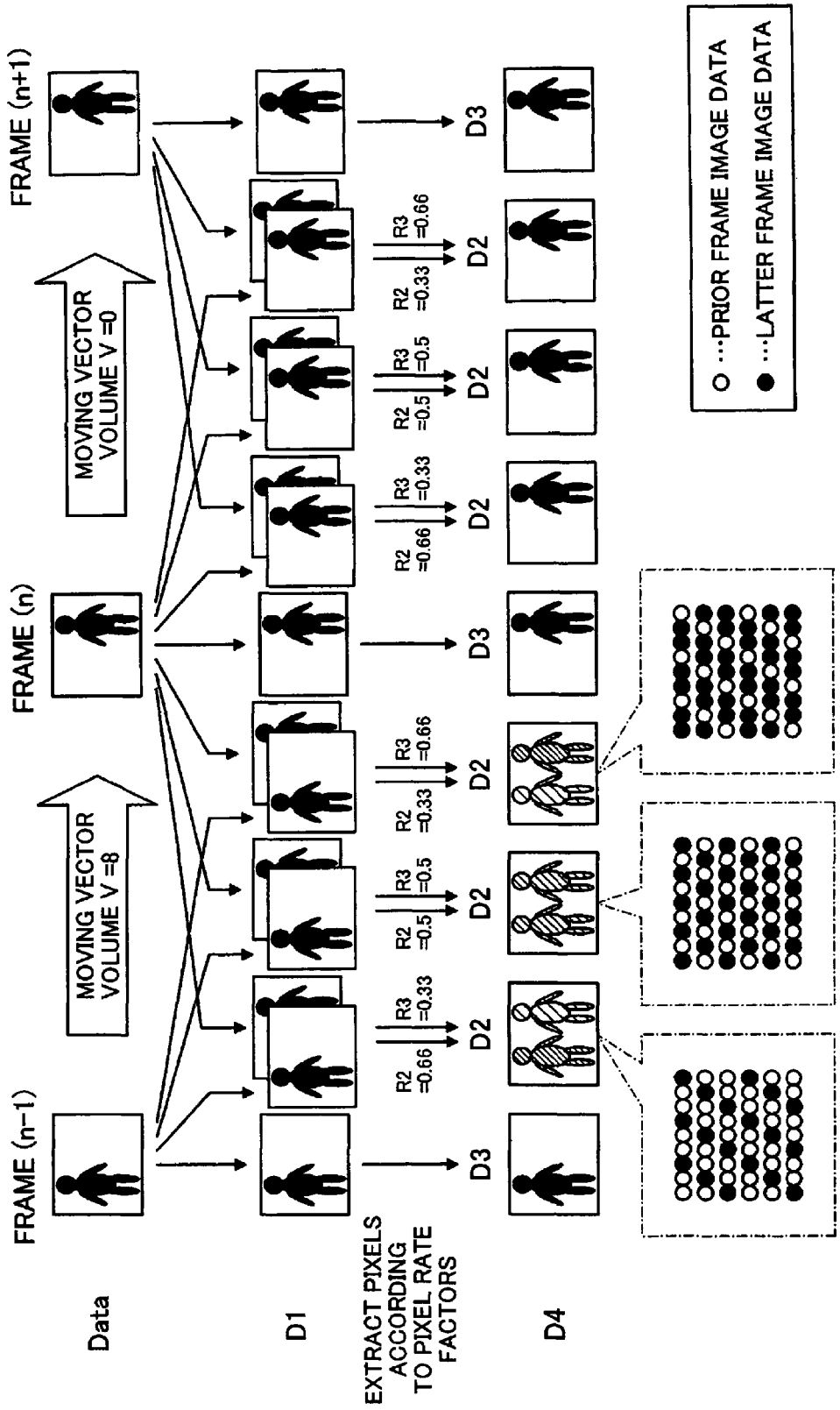
FIG. 8 shows visual representation of a moving image formed on the liquid crystal panel 180 in a third embodiment of the invention.

FIG. 8 shows visual representation of a moving image formed on the liquid crystal panel 180 in the third embodiment. As shown in the upper row and the middle row of FIG. 8, in the third embodiment, when the memory write control circuit 120 sequentially writes frame image data of frames (n−1), (n), and (n+1) into the frame memory 130, the control circuit 250 reads out the frame image data seven consecutive times at a 4-fold cycle of the frame rate of the original moving image. Alternate output of corresponding pixels attains simultaneous read-out of the prior frame image by its fifth scan and the latter frame image by its first scan, simultaneous read-out of the prior frame image by its sixth scan and the latter frame image by its second scan, and simultaneous read-out of the prior frame image by its seventh scan and the latter frame image by its third scan. Among the seven outputs of each overscanned frame image, the fourth output goes through the processing by the $1^{st}$ latch circuit 272 and the $3^{rd}$ latch circuit 276 and is directly output as the frame image data D4 by the selection circuit 240 as shown in the bottom row of FIG. 8. The synthesis circuit 230 combines the pixels from each set of the simultaneously read-out frame images according to the respectively specified values of the pixel rate factors R2 and R3 to generate three consecutive intermediate frame image data D2. The generated intermediate frame image data D2 go through the $2^{nd}$ latch circuit 274 and are selected and output as the frame image data D4 by the selection circuit 240.

In the illustrated example of FIG. 8, the first intermediate frame image, the second intermediate frame image, and the third intermediate frame image of the three consecutively generated intermediate frame image data D2 have different settings of the pixel rate factor R2 and the pixel rate factor R3. The first intermediate frame image has the pixel rate factor R2=0.66 and the pixel rate factor R3=0.33. The second intermediate frame image has the pixel rate factor R2=0.5 and the pixel rate factor R3=0.5. The third intermediate frame image has the pixel rate factor R2=0.33 and the pixel rate factor R3=0.66. This gradually lowers the mixing rate of the prior frame image with a gradual increase in mixing rate of the latter frame image and has the visual effect of a continuous motion of a moving body. The technique of the third embodiment enables the smooth video display than those of the first embodiment and the second embodiment.

The first through the third embodiments described above respectively generate one through three intermediate frame images between each pair of existing frame images. The similar technique is adoptable to set the values of the pixel rate factors R2 and R3 for each intermediate frame image and generate four or more intermediate frame images between each pair of existing frame images. A moving image is displayed at a cycle of multiplication of the frame rate of the original moving image corresponding to the number of intermediate frame images generated between each pair of existing frame images. An increase in intermediate frame images generated between each pair of existing frame images enhances the effect of reducing the flicker in the moving image.

D. Modifications

The embodiments discussed above are to be considered in all aspects as illustrative and not restrictive. There may be many modifications, changes, and alterations without departing from the scope or spirit of the main characteristics of the present invention. For example, the functions of the hardware elements may be attained by the software configuration by the computer for the video display. Some possible modifications are given below.

(D-1) Modification 1

One modified process of specifying the values of the pixel rate factors R2 and R3 is described below with reference to FIGS. 9 through 11. In this Modification, the pixel rate factor specification circuit 210 (see FIG. 2) determines the values of the pixel rate factors R2 and R3 independently of the moving vector volume V but according to the number 'n' of intermediate frame images to be generated between each pair of existing frames and the characteristics of sinusoidal waves.

Figures 9, 10:
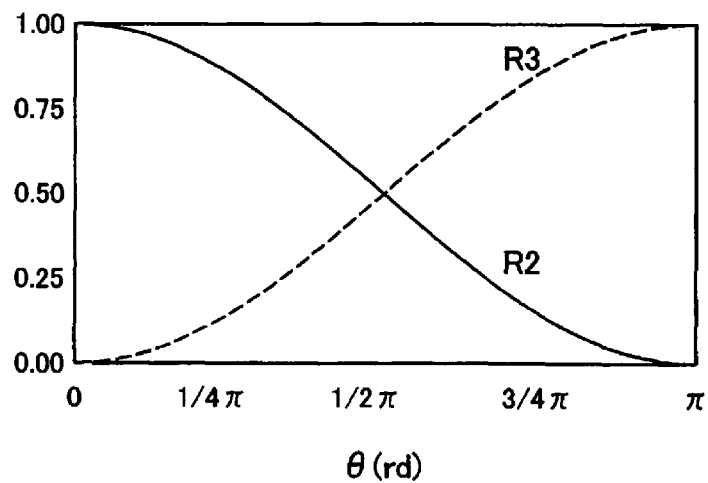
FIG. 9 is a table defining the values obtained by dividing a range of 0 to $\pi$ by the number of intermediate frame images.
FIG. 10 is a graph showing functions used for specification of pixel rate factors R2 and R3.

In this Modification, when the CPU 190 sets the number 'n' of intermediate frame images to be generated by the synthesis circuit 230, the pixel rate factor specification circuit 210 refers to the table of FIG. 9 and specifies an angle θ (rd) (0≦θ≦π) for each intermediate frame image to determine the values of the pixel rate factors R2 and R3. The table of FIG. 9 defines the values obtained by dividing the range of 0 to π by the number 'n' of intermediate frame images. For example, in the case of generation of 3 intermediate frame images, the angle θ is respectively equal to (¼)π for the first intermediate frame image, (½)π for the second intermediate frame image, and (¾)π for the third intermediate frame image. The pixel rate factors R2 and R3 used for generation of each intermediate frame image are then determined according to the specified angle θ and the sine functions of Equations (2) and (3) given below:

$$R2=(\cos\theta)/2+0.5 \qquad (2)$$

$$R3=0.5-(\cos\theta)/2 \qquad (3)$$

Equation (2) shows the sine function varying from its maximum (=1) to its minimum (=0), and Equation (3) shows the sine function varying from its minimum (=0) to its maximum (=1). FIG. 10 is a graph showing the variations of these sine functions. FIG. 11 shows a concrete example of the settings of the pixel rate factors R2 and R3 corresponding to each value of the angle θ.

Figures 11, 12:
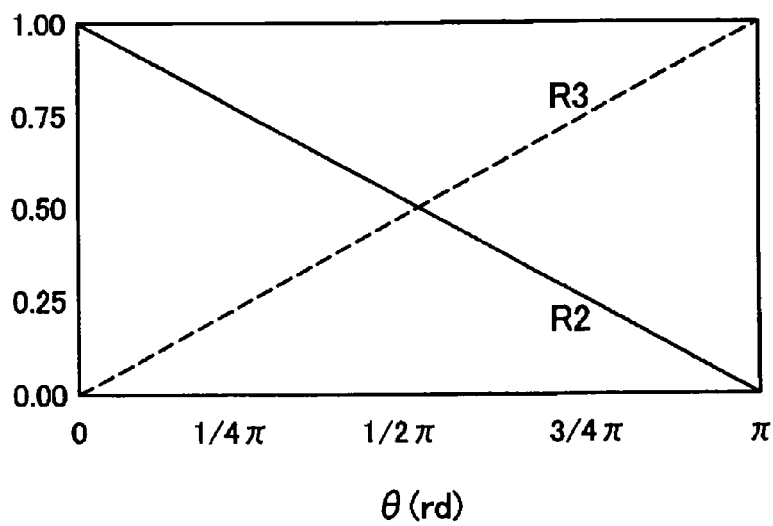
FIG. 11 shows a concrete example of the settings of the pixel rate factors R2 and R3 corresponding to each value of an angle $\theta$.
FIG. 12 is a graph showing functions of linearly decreasing the pixel rate factor R2 from 1 to 0 and linearly increasing the pixel rate factor R3 from 0 to 1.

In the case of generation of 3 intermediate frame images according to the sine functions of (2) and (3), the table of FIG. 11 specifies the settings of the pixel rate factor R2=0.85 and the pixel rate factor R3=0.15 for the first intermediate frame image, the settings of the pixel rate factor R2=0.50 and the pixel rate factor R3=0.50 for the second intermediate frame image, and the settings of the pixel rate factor R2=0.15 and the pixel rate factor R3=0.85 for the third intermediate frame image.

The process of this Modification determines the values of the pixel rate factors for each intermediate frame image according to the characteristics of the sinusoidal waveforms. The tracking characteristics of the human vision against a variation in mixing ratio of two images are approximate to the characteristics of the sinusoidal waves. The technique of this Modification ensures a smooth variation in mixing ratio of two images in the case of generation of any number of intermediate frame images and effectively reduces the flicker in the moving image.

This Modification uses the sine functions to determine the values of the pixel rate factors. Any of various gradually-increasing and gradually-decreasing functions may be used for the same purpose. One example of the available functions is shown in FIG. 12.

FIG. 12 is a graph showing functions of linearly decreasing the pixel rate factor R2 from 1 to 0 and linearly increasing the pixel rate factor R3 from 0 to 1. These functions also ensure the effects of gradually lowering the effect of the prior frame image with a gradual increase in effect of the latter frame image, thus attaining smooth video display.

(D-2) Modification 2

The above embodiments specify the values of the pixel rate factors R2 and R3 according to the moving vector volume between two adjoining frame images stored in the frame memory 130. One modified procedure may specify the values of the pixel rate factors R2 and R3 according to a variation in luminance between two adjoining frame images.

In this modified structure, the pixel rate factor specification circuit 210 calculates an average of luminance values of the respective pixels constituting a prior frame image and an average of luminance values of the respective pixels constituting a latter frame image and computes a variation in luminance from these calculated averages. When the computed variation in luminance is positive, the value of the pixel rate factor R2 applied to the prior frame image is set to be lower than the value of the pixel rate factor R3 applied to the latter frame image, based on the positive luminance variation. When the computed variation in luminance is negative, on the other hand, the value of the pixel rate factor R2 applied to the prior frame image is set to be higher than the value of the pixel rate factor R3 applied to the latter frame image, based on the negative luminance variation. This modified arrangement ensures smooth display of a moving image.

(D-3) Modification 3

The above embodiments regard the projector 100 as one application of the moving image display device of the invention. The moving image display device of the invention may be actualized as any of liquid crystal displays, CRT displays, and plasma displays. In such applications, the liquid crystal driver 170 and the liquid crystal panel 180 shown in FIG. 1 are replaced by a driving circuit and a display device adequate for each moving image display device. The pixel rate factors may be changeable according to the type of the display device.

(D-4) Modification 4

In the embodiments described above, each intermediate frame image is generated with adjustment of the mixing rates of the prior frame and the latter frame (pixel ratio). One modified procedure may vary the luminance values of the respective frame images as the sources of synthesis, simultaneously with combining the prior frame with the latter frame at the preset mixing rates. The intermediate frame generation process of this Modification lowers the luminance value of the prior frame image with a gradual decrease in mixing rate of the prior frame image, while raising the luminance value of the latter frame image with a gradual increase in mixing rate of the latter frame image.

(D-5) Modification 5

In the above embodiments, the intermediate frame generating circuit 140 extracts the preset number of pixels from the prior frame image and the preset number of pixels from the latter frame image corresponding to the values of the pixel rate factors R2 and R3 specified by the pixel rate factor specification circuit 210 and combines the extracted pixels to generate each intermediate frame image. One modified procedure may extract preset numbers of lines from the prior frame image and from the latter frame image corresponding to the specified values of the pixel rate factors R2 and R3 to generate each intermediate frame image. For example, when the specified values of the pixel rate factor R2 and the pixel rate factor R3 are respectively equal to 0.33 and 0.66, the modified procedure extracts 1-line data from the prior frame image and 2-line data from the latter frame image and combines the extracted line data to generate an intermediate frame image. This modified arrangement reads out each frame image data in the units of lines from the frame memory 130 and thus enables high-speed generation of each intermediate frame image.

(D-6) Modification 6

In the above embodiments, the intermediate frame generating circuit 140 extracts pixels from the prior frame image and pixels from the latter frame image according to the values of the pixel rate factors R2 and R3 specified by the pixel rate factor specification circuit 210 and combines the extracted pixels to generate each intermediate frame image. In one possible modification, the pixel rate factor specification circuit 210 may select a mask pattern for defining extraction of pixels from either the prior frame image or the latter frame image corresponding to the moving vector volume V.

Figure 13:
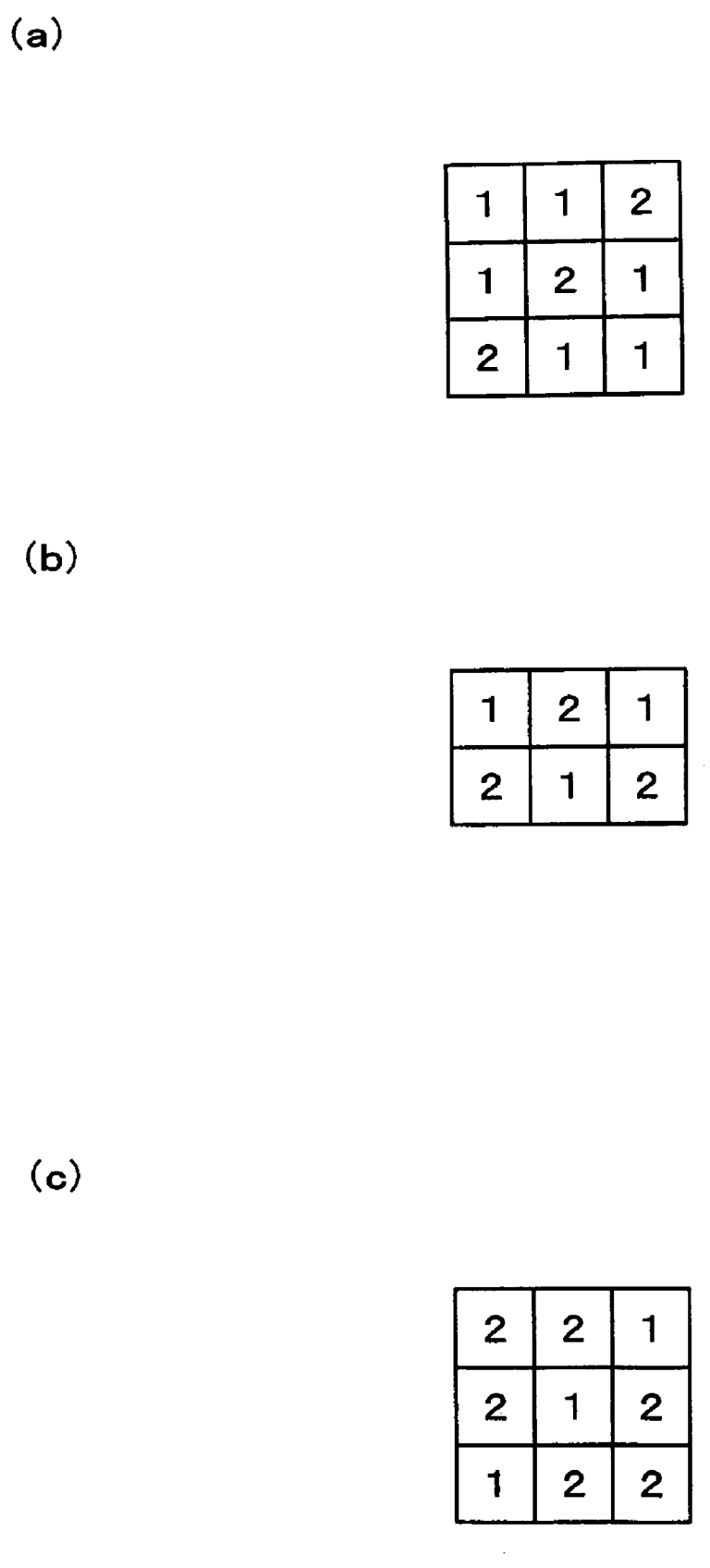

FIG. 13 shows mask patterns applicable in this Modification. The mask pattern of FIG. 13(a) is applied to the combination of the pixel rate factor R2=0.66 and the pixel rate factor R3=0.33. In the mask patterns of FIG. 13, squares with the numeral '1' represent pixels extracted from the prior frame image and squares with the numeral '2' represent pixels extracted from the latter frame image.

The mask pattern of FIG. 13(b) is applied to the combination of the pixel rate factors R2 and R3 both equal to 0.5. The mask pattern of FIG. 13(c) is applied to the combination of the pixel rate factor R2=0.33 and the pixel rate factor R3=0.66.

In this Modification, the pixel rate factor specification circuit 210 selects one mask pattern among stored multiple mask patterns corresponding to the moving vector volume V and transfers the selected mask pattern to the synthesis circuit 230. The synthesis circuit 230 refers to the received mask pattern and complementarily extracts pixels from the prior frame image and from the latter frame image input from the $1^{st}$ latch circuit 272. Application of such mask patterns enables extremely easy generation of intermediate frame images.

(D-7) Modification 7

In the embodiments described above, the intermediate frame generating circuit 140 sequentially reads pixels from the prior frame image and from the latter frame image for synthesis only at the timing of generation of an intermediate frame image. In one modified structure, the control circuit 250 continually performs sequential read-out of pixels from the prior frame image and from the latter frame image. As the pixel rate factor specification circuit 210 or the synthesis circuit 230 sequentially varies the mixing ratio of the prior frame image to the latter frame image like 1:0, 1:1, 1:0, 1:1, the synthesis circuit 230 performs the synthesis of an intermediate frame image according to the varying mixing ratio.

In one example, in the case of generation of one intermediate frame image between each set of existing frame images, the synthesis at the varying mixing ratio of 1:0, 1:1, 1:0, 1:1, . . . alternately generates an intermediate frame image including 100% of pixels from the prior frame image and an intermediate frame image including 50% of pixels from the prior frame image and 50% of pixels from the latter frame image. In another example, in the case of generation of two intermediate frame images between each set of existing frame images, the synthesis at the varying mixing ratio of 1:0, 2:1, 1:2, 1:0, 2:1, 1:2, . . . sequentially generates an intermediate frame image including 100% of pixels from the prior frame image, an intermediate frame image including 66% of pixels from the prior frame image and 33% of pixels from the latter frame image, and an intermediate frame image including 33% of pixels from the prior frame image and 66% of pixels from the latter frame image. In general, in the case of generation of 'S' intermediate frame images between each set of existing frame images, the procedure provides (S+1) synthesis ratios including a synthesis ratio of 1:0 and sequentially performs the synthesis corresponding to the (S+1) synthesis ratios to readily prepare series of frame images including original frame images and newly generated intermediate frame images. The (S+1) synthesis ratios are, for example, 1:0, S:1, (S−1):2, . . . , and 1:S.

In this Modification, the synthesis circuit 230 sequentially outputs original frame images and intermediate frame images. The $3^{rd}$ latch circuit 276 and the selection circuit 240 may thus be omitted from the intermediate frame generating circuit 140 shown in FIG. 2. This modified arrangement attains the extremely simple circuit structure and the resulting cost reduction.

(D-8) Modification 8

In any of the above embodiments, the read-out of images from the frame memory 130 by the control circuit 250 and the synthesis by the synthesis circuit 230 are performed in the units of pixels. The unit of processing is not restricted to the pixel but may be the frame, the line, or the scanning line. The processing unit is determinable according to the data volume held by each latch circuit and the buffer capacity of the synthesis circuit 230.

(D-9) Modification 9

Some of the above embodiments regard generation of multiple intermediate frame images between each set of existing frame images. One modified procedure may generate one of the multiple intermediate frame images as a displayed image of low luminance.

FIG. 14 shows generation of intermediate frame images in this Modification. In the illustrated example, three intermediate frame images are generated between each set of existing frame images, and the pixel rate factor R2 applied to the prior frame image and the pixel rate factor R3 applied to the latter frame image are both set equal to 0 for one of the three intermediate frame images. Setting both the pixel rate factors R2 and R3 equal to 0 causes an intermediate frame image having all black pixels to be displayed as a mask image at a fixed timing. The display of the black mask image at regular intervals effectively prevents the persistence of vision that is characteristic of hold-type display devices, such as liquid crystal panels. The sum of the pixel rate factors R2 and R3 of less than 1 lowers the luminance of a resulting composite image. This gives a mask image of lower luminance and accordingly relieves the persistence of vision.

The procedure of this Modification sets the value '0' to both the pixel rate factors R2 and R3 respectively applied to the prior frame image and the latter frame image to generate a mask image. Composition of two frame images of lowered luminance gives a mask image of lower luminance. Another possible modification may insert a black mask image, in place of one intermediate frame image at timings of displaying the intermediate frame image among multiple intermediate frame images. Any of the synthesis circuit 230, the selection circuit 240, and the scaling circuit 160 may perform the insertion of the mask image. This modified arrangement also effectively prevents the persistence of vision. In the illustrated example of FIG. 14, one of the three intermediate frame images is set as a black mask image. This number is, however, not restrictive. In general, one of at least two intermediate frame images may be set as a black mask image.

The above description regards several embodiments and modifications of the moving image display device of the invention. The moving image display device of the invention may further have any of the following modifications and arrangements.

In one preferable application of the moving image display device of the invention, the mixing rate specification unit sets a first pixel rate factor of not less than 0 and of less than 1 to be applied to extraction of pixels from the first frame image and a second pixel rate factor of not less than 0 and of less than 1 to be applied to extraction of pixels from the second frame image, as the parameters. The use of the first pixel rate factor and the second pixel rate factor facilitates extraction of pixels from the first frame image and the second frame image corresponding to the respective mixing rates.

The first pixel rate factor and the second pixel rate factor set by the mixing rate specification unit may be an identical value. This arrangement does not require individual specification of the pixel rate factors for the first frame image and the second frame image and thus desirably simplifies the processing.

The first pixel rate factor set by the mixing rate specification unit may be greater than the second pixel rate factor set by the mixing rate specification unit. This makes the mixing rate of the first frame image higher than the mixing rate of the second frame image and accordingly generates an intermediate frame image having the greater influence of the first frame image displayed first in time.

The first pixel rate factor set by the mixing rate specification unit may be smaller than the second pixel rate factor set by the mixing rate specification unit. This makes the mixing rate of the first frame image lower than the mixing rate of the second frame image and accordingly generates an intermediate frame image having the greater influence of the second frame image displayed later in time.

In one preferable embodiment of the invention, the moving image display device further has a moving vector volume detection unit that computes a moving vector volume of an image of a moving body included in the first frame image and the second frame image. The mixing rate specification unit sets the first pixel rate factor and the second pixel rate factor corresponding to the computed moving vector volume. This arrangement specifies the pixel rate factors corresponding to the computed moving vector volume between two frame images, thus ensuring smooth video display.

In one preferable application of the moving image display device of this embodiment, the mixing rate specification unit refers to a table, which is provided in advance to define a relation between the first pixel rate factor and the second pixel rate factor, to set the first pixel rate factor and the second pixel rate factor. This arrangement readily specifies the pixel rate factors corresponding to the computed moving vector volume by simple reference to the table, thus enhancing the total processing speed.

In another preferable embodiment of the invention, the moving image display device further has a luminance variation computation unit that computes a variation in luminance between the first frame image and the second frame image. The mixing rate specification unit sets the first pixel rate factor and the second pixel rate factor corresponding to the computed variation in luminance. This arrangement specifies the pixel rate factors corresponding to the computed variation in luminance between two frame images, thus ensuring smooth video display.

In one preferable application of the moving image display device, the mixing rate specification unit sets the first pixel rate factor and the second pixel rate factor to be applied to generation of each intermediate frame image, based on a total number of intermediate frame images generated by the synthesis unit. This arrangement individually sets the pixel rate factors for each of the multiple intermediate frame images, thus ensuring smooth video display.

In one configuration of the moving image display device, the synthesis unit generates at least two intermediate frame images. The mixing rate specification unit sets the first pixel rate factor to be greater than the second pixel rate factor for one of the at least two intermediate frame images displayed closer to the first frame image, while setting the first pixel rate factor to be smaller than the second pixel rate factor for one of the at least two intermediate frame images displayed closer to the second frame image. This arrangement generates intermediate frame images with a gradual decrease in mixing rate of the first frame image and a gradual increase in mixing rate of the second frame image, thus ensuring smooth video display.

In another configuration of the moving image display device, the mixing rate specification unit provides a first function of gradually increasing from 0 to 1 in a preset range and a second function of gradually decreasing from 1 to 0 in the preset range, divides the preset range by a number of intermediate frame images to be generated, and sets the first pixel rate factor and the second pixel rate factor according to values of the first function and the second function at each divisional point. The pixel rate factors can readily be determined according to the first function and the second function.

The first function and the second function provided by the mixing rate specification unit may be sine functions varying between a minimum and a maximum. The tracking characteristics of the human vision against a variation in mixing ratio of two images are approximate to the characteristics of the sinusoidal waves. Determination of the pixel rate factors according to the sine functions ensures smooth video display.

In the moving image display device of the invention, a processing unit of the read-out process of the first frame image and the second frame image by the read-out unit and a processing unit of the synthesis unit may be any one of a frame, a line, a pixel, and a scanning line in the respective frame images. This arrangement enables generation of each intermediate frame image in the optimal unit selected by taking into account the capacity of a frame memory included in the moving image display device. The processing units of the read-out unit and the synthesis unit may be identical with each other or may be different from each other.

In one preferable application of the moving image display device of the invention, the display unit displays the multiple frame images and the generated intermediate frame images at a multiplication of the frame rate corresponding to the number of the generated intermediate frame images. The moving image is displayed at the enhanced frame rate with insertion of the generated intermediate frame images. This ensures smooth video display.

In one preferable embodiment of the moving image display device of the invention, the synthesis unit generates at least two intermediate frame images, and the display unit displays a predetermined mask image of low luminance, instead of one selected intermediate frame image of the at least two intermediate frame images, at timings of displaying the selected intermediate frame image. The mask image may be an image of reduced luminance prepared by application of a luminance factor of less than 1 to an original image or may be a preset image consisting of only pixels of low luminance, for example, black pixels.

In another preferable embodiment of the moving image display device of the invention, the synthesis unit generates at least two intermediate frame images, and the mixing rate specification unit sets a sum of the first pixel rate factor and the second pixel rate factor to be less than 1 and applies the setting to one selected intermediate frame image of the at least two intermediate frame images generated by the synthesis unit. One of the multiple intermediate frame images is displayed as a black mask image of low luminance. This arrangement effectively prevents flicker in a moving image, as well as the persistence of vision that is characteristic of hold-type display devices, such as liquid crystal panels.

The technique of the invention is not restricted to the moving image display device described above but may be actualized by a corresponding moving image display method or a computer program product. The computer program product may be any computer-readable recording medium. Typical examples of the recording medium include flexible disks, CD-ROMs, DVD-ROMs, magneto-optical disks, memory cards, and hard disks.

Any and all such modifications within the meaning and range of equivalency of the claims are intended to be embraced therein. The scope and spirit of the present invention are indicated by the appended claims, rather than by the foregoing description.

What is claimed is:

1. A moving image display device that sequentially displays frame images, each consisting of multiple pixels, for video display, said moving image display device comprising:
    an input unit that inputs a moving image of multiple frame images at a preset frame rate;
    a read-out unit that reads out a first frame image and a subsequent second frame image, which is to be displayed immediately after the first frame image, from the input moving image;
    a mixing rate specification unit that specifies parameters representing mixing rates of the first frame image and the second frame image for synthesis;

a synthesis unit that extracts pixels from the first frame image and from the second frame image in a complementary manner according to the specified parameters and combines the extracted pixels to generate at least one intermediate frame image; and a display unit that displays the generated at least one intermediate frame image after the first frame image and before the second frame image in the process of displaying the moving image.

2. A moving image display device in accordance with claim 1, wherein said mixing rate specification unit sets a first pixel rate factor of not less than 0 and of less than 1 to be applied to extraction of pixels from the first frame image and a second pixel rate factor of not less than 0 and of less than 1 to be applied to extraction of pixels from the second frame image, as the parameters.

3. A moving image display device in accordance with claim 2, wherein the first pixel rate factor and the second pixel rate factor set by said mixing rate specification unit are an identical value.

4. A moving image display device in accordance with claim 2, wherein the first pixel rate factor set by said mixing rate specification unit is greater than the second pixel rate factor set by said mixing rate specification unit.

5. A moving image display device in accordance with claim 2, wherein the first pixel rate factor set by said mixing rate specification unit is smaller than the second pixel rate factor set by said mixing rate specification unit.

6. A moving image display device in accordance with claim 2, said moving image display device further comprising:

a moving vector volume detection unit that computes a moving vector volume of an image of a moving body included in the first frame image and the second frame image, wherein said mixing rate specification unit sets the first pixel rate factor and the second pixel rate factor corresponding to the computed moving vector volume.

7. A moving image display device in accordance with claim 6, wherein said mixing rate specification unit refers to a table, which is provided in advance to define a relation between the first pixel rate factor and the second pixel rate factor, to set the first pixel rate factor and the second pixel rate factor.

8. A moving image display device in accordance with claim 2, said moving image display device further comprising:

a luminance variation computation unit that computes a variation in luminance between the first frame image and the second frame image, wherein said mixing rate specification unit sets the first pixel rate factor and the second pixel rate factor corresponding to the computed variation in luminance.

9. A moving image display device in accordance with claim 2, wherein said mixing rate specification unit sets the first pixel rate factor and the second pixel rate factor to be applied to generation of each intermediate frame image, based on a total number of intermediate frame images generated by said synthesis unit.

10. A moving image display device in accordance with claim 9, wherein said synthesis unit generates at least two intermediate frame images, and said mixing rate specification unit sets the first pixel rate factor to be greater than the second pixel rate factor for one of the at least two intermediate frame images displayed closer to the first frame image, while setting the first pixel rate factor to be smaller than the second pixel rate factor for one of the at least two intermediate frame images displayed closer to the second frame image.

11. A moving image display device in accordance with claim 9, wherein said mixing rate specification unit provides a first function of gradually increasing from 0 to 1 in a preset range and a second function of gradually decreasing from 1 to 0 in the preset range, divides the preset range by a number of intermediate frame images to be generated, and sets the first pixel rate factor and the second pixel rate factor according to values of the first function and the second function at each divisional point.

12. A moving image display device in accordance with claim 11, wherein the first function and the second function provided by said mixing rate specification unit are sine functions varying between a minimum and a maximum.

13. A moving image display device in accordance with claim 2, wherein said synthesis unit generates at least two intermediate frame images, and said mixing rate specification unit sets a sum of the first pixel rate factor and the second pixel rate factor to be less than 1 and applies the setting to one selected intermediate frame image of the at least two intermediate frame images generated by said synthesis unit.

14. A moving image display device in accordance with claim 1, wherein a processing unit of the read-out process of the first frame image and the second frame image by said read-out unit and a processing unit of said synthesis unit are any one of a frame, a line, a pixel, and a scanning line in the respective frame images.

15. A moving image display device in accordance with claim 1, wherein said display unit displays the multiple frame images and the generated intermediate frame images at a multiplication of the frame rate corresponding to the number of the generated intermediate frame images.

16. A moving image display device in accordance with claim 1, wherein said synthesis unit generates at least two intermediate frame images, and said display unit displays a predetermined mask image of low luminance, instead of one selected intermediate frame image of the at least two intermediate frame images, at timings of displaying the selected intermediate frame image.

17. A moving image display method that sequentially displays frame images, each consisting of multiple pixels, for video display, said moving image display method comprising the steps of inputting a moving image of multiple frame images at a preset frame rate;

reading out a first frame image and a subsequent second frame image, which is to be displayed immediately after the first frame image, from the input moving image;

specifying parameters representing mixing rates of the first frame image and the second frame image for synthesis;

extracting pixels from the first frame image and from the second frame image in a complementary manner according to the specified parameters and combining the extracted pixels to generate at least one intermediate frame image; and displaying the generated at least one intermediate frame image after the first frame image and before the second frame image in the process of displaying the moving image.

18. A computer program product that causes a computer to sequentially display frame images, each consisting of multiple pixels, for video display, said computer program product comprising a computer program and a recording medium for recording said computer program therein, said computer program comprising:

a first program code of inputting a moving image of multiple frame images at a preset frame rate;

a second program code of reading out a first frame image and a subsequent second frame image, which is to be displayed immediately after the first frame image, from the input moving image;

a third program code of specifying parameters representing mixing rates of the first frame image and the second frame image for synthesis;

a fourth program code of extracting pixels from the first frame image and from the second frame image in a complementary manner according to the specified parameters and combining the extracted pixels to generate at least one intermediate frame image; and a fifth program code of displaying the generated at least one intermediate frame image after the first frame image and before the second frame image in the process of displaying the moving image.

\* \* \* \* \*